United States Patent [19]

Koike et al.

[11] Patent Number: 4,664,994
[45] Date of Patent: May 12, 1987

[54] ENCLOSED LEAD STORAGE BATTERY AND PROCESS FOR PRODUCING THE SAME

[75] Inventors: Kiichi Koike, Fujisawa; Yoshie Suzuki, Chigasaki; Minoru Yoshinaka, Fujisawa; Mitsuo Okabe, Yokohama; Makoto Tanaka, Tokyo, all of Japan

[73] Assignees: Matsushita Electric Industrial Co., Ltd., Osaka; Dainippon Printing Co., Ltd., Tokyo, both of Japan

[21] Appl. No.: 904,754

[22] Filed: Sep. 5, 1986

Related U.S. Application Data

[63] Continuation of Ser. No. 726,313, Apr. 23, 1985, abandoned.

[30] Foreign Application Priority Data

Apr. 26, 1984 [JP] Japan .................................. 59-85456
Apr. 26, 1984 [JP] Japan .................................. 59-85457

[51] Int. Cl.$^4$ .............................................. H01M 2/02
[52] U.S. Cl. .................................... 429/163; 429/181; 429/185; 429/225; 429/54
[58] Field of Search ............... 429/163, 176, 181, 185, 429/54, 225

[56] References Cited

U.S. PATENT DOCUMENTS

| | | | |
|---|---|---|---|
| 2,700,695 | 1/1955 | Gottschall | 429/176 |
| 2,708,340 | 1/1973 | Tamminen | 429/163 X |
| 3,196,049 | 7/1965 | Schilke | 429/163 X |
| 3,738,860 | 6/1973 | Roda et al. | 429/163 X |
| 4,383,011 | 5/1983 | McClelland et al. | 429/149 X |

*Primary Examiner*—Anthony Skapars
*Attorney, Agent, or Firm*—Stevens, Davis, Miller & Mosher

[57] ABSTRACT

The present invention provides an enclosed lead storage battery comprising a plate assembly consisting of a positive plate, negative plates and a separator, an electrolyte held in position by the plate assembly, and a jacket made of film- or sheet-formed synthetic resin and surrounding the plate assembly and electrolyte. The jacket is of a multilayer laminate structure made by disposing a polyolefin film on the inside contacting the plate assembly and laminating a film of thermoplastic synthetic resin in two or more layers on the outside thereof. According to the present invention, the plate assembly can be encased with an unexpensive jacket of a simple construction, and the joint of the jacket to the pole posts of the plate assembly is strengthened to offer a leak-proof enclosed lead storage battery.

10 Claims, 4 Drawing Figures

ENCLOSED LEAD STORAGE BATTERY AND PROCESS FOR PRODUCING THE SAME

This application is a continuation of application Ser. No. 726,313 filed Apr. 23, 1985 now abandoned.

BACKGROUND OF THE INVENTION

The present invention relates to an enclosed lead storage battery usable as power source for portable electric devices. More particularly, the present invention relates to the improvements on the jacket enveloping electrode plate assembly and on the post extending out from the jacket.

Enclosed lead storage battery is widely used as a portable small-sized power source because of its electrolyte leak-proof structure. In such battery, the electrolyte is held against flowing by a separator such as glass mat so that it would not overflow the battery case or jacket.

In the conventional enclosed lead storage batteries, the electrode plate assembly consisting of a positive plate, a negative plate and a separator is housed in a box-like casing made of a synthetic resin material such as ABS resin (acrylonitrile-butadiene-styrene resin), and the casing is sealed by fastly bonding or welding a cover thereto.

In such conventional enclosed lead storage batteries, however, because of said structure, the shape and size of the battery case necessarily vary according to the battery voltage and capacity, so that the product batteries are varied in shape and size, which makes it difficult to mass-produce such batteries at low cost. Also, the production process involves many steps which defy mechanization such as insertion of plate assembly into the case, joining of cover and case, fitting of safety valve, etc., so that the productivity of such batteries is low resulting in high production cost.

As a solution to such problem, Japanese Patent Laid-Open No. 207558/84 proposes a method in which the battery case is made from a film- or sheet-formed synthetic resin such as polyethylene to envelop the plate assembly therein and the case is sealed by heat-sealing peripheral parts of the resins each other while simultaneously forming a safety valve. With such film or sheet of resin, however, it is difficult to meet the property requirements for battery case such as moisture permeability, oxygen permeability, acid resistance, tensile strength, burst strength, etc., and this has been a great obstacle to the commercialization of this type of batteries.

Also, in the batteries of such structure, it is required that each post is heat sealed with high reliability of sealing to the film- or sheet-formed synthetic resin constituting the jacket which envelops the plate assembly, with the end of said post extending out from the jacket. For such high-reliability of sealing, it is necessary to coat the thin ribbon-shaped or rod-like post with a polyethylene or polypropylene synthetic resin which can be heat sealed to the jacket, but there is yet available no method capable of commercial production of such posts at low cost.

Even if the post surface is directly coated with polyethylene or polypropylene synthetic resin, no strong adhesion is obtained between base lead or lead alloy and resin coating and the electrolyte would penetrate into the adhesion area between base post material and synthetic resin and leak out in a short time after coating due to capillarity of the electrolyte or corrosion of post. This has been another serious problem to be overcome for aquiring commercial reliability of this type of batteries.

SUMMARY OF THE INVENTION

The first object of the present invention is to satisfy the property requirements for the jacket of enclosed lead storage battery by disposing a heat sealable polyolefin film on the inside of the jacket contacting the plate assembly and further laminating on the outside thereof a laminate film or sheet of synthetic resin made by laminating films or net of various kinds of synthetic resin.

The second object of the present invention is to improve the synthetic resin coating applied on the post to enable secure heat seal of the post and the coating film or sheet of synthetic resin forming the outer jacket and to realize high-reliability of sealing.

The third object of the present invention is to enable enveloping of the plate assembly of any thickness and size with ease and at least cost by heat-sealing peripheral parts of the laminated film or sheet of synthetic resins enveloping the plate assembly to each other.

The fourth object of the present invention is to provide an enclosed lead storage battery of which the production steps are easy of mechanization and automation to enable commercial production of the battery.

Other objects of the present invention will become apparent as the invention is described more fully hereinbelow.

The present invention relates to an enclosed lead storage battery characterized in that the plate assembly consisting of a positive plate, negative plates and a separator and the electrolyte made of dilute sulfuric acid and held in position by said plate assembly are enveloped by a jacket made by disposing a polyolefin film on the side contacting the plate assembly and laminating on the outside thereof a thermoplastic synthetic resin such as polyethylene terephthalate, polypropylene, nylon and the like, with the peripheral parts of the jacket surrounding the plate assembly being heat-sealed the each other.

In the construction of said jacket, the film provided on the innermost face contacting the plate assembly is preferably a polyolefin film because of its excellent heat sealing property and acid resistance, and the barrier layer provided on the outside thereof is preferably made of a thermoplastic synthetic resin having an oxygen permeability of 20 cc/m$^2$. 24 hr.atm. or below and moisture permeability of 10 g/m$^2$.24 hr. or below. Of course, such barrier layer suits the purpose if said property requirements are met by the laminate film or sheet as a whole.

The polyolefin resins usable for said purpose include low-density polyethylene, medium-density polyethylene, high-density polyethylene, linear low-density polyethylene, polypropylene and their copolymers such as ethylene-vinyl acetate copolymer, ethylene-acrylic acid copolymer, ethylene-methacrylic acid copolymer, ethylene-acrylic ester copolymer, ethylene-methacrylic ester copolymer, ethylene-propylene copolymer, as well as terpolymers. Such polymers or copolymers may be modified by graft polymerization with an unsaturated carboxylic acid such as acrylic acid, methacrylic acid, maleic acid, maleic anhydride, citraconic acid, citraconic anhydride, itaconic acid, itaconic anhydride, etc., or anhydrides of such unsaturated carboxylic acids.

Ionomers crosslinked with metal ions such as sodium ions $Na^+$, zinc ions $Zn^{++}$, etc., can be applied as unsaturated carboxylic acids having carboxyl groups.

The barrier layer used in the present invention can be embodied as a laminate film formed by laminating a polyvinylidene chloride (PVDC) film on other film, or as a so-called k-coated film made by coating said PVDC film with a polyester film, polypropylene film, polyamide film or the like. Such barrier layer can be also formed by laminating polyvinyl alcohol, saponified ethylene-vinyl acetate copolymer, polyacrylonitrile and its copolymer, or polyvinyl chloride. The film may be multilayered for reinforming the physical strength of the whole laminate film. It is also effective for providing an appreciable improvement of mechanical strength or tensile strength to laminate a netted fabric made from polyolefin or polyester stretched yarns.

Lamination of film or sheet can be accomplished by known methods such as dry lamination using urethane resin, polyester resin, ethylene-vinyl acetate copolymer resin or the like as adhesive agent, extrusion lamination, etc. Dry lamination is preferred in view of content resistance, adhesion, etc., of olefin film used as the innermost layer.

The laminate film obtained by combining various types of proper films is provided with sufficient tensile strength and burst strength, but such physical strength can be further improved in a large measure by incorporating a netted fabric in the laminate.

Such laminate film can of course be used singly in the form as it is, but an additional polyolefin film or films may be further applied thereto to constitute a double- or triple-wall pouch structure. In the latter case, the laminate is improved in pinhole resistance at bending. Also, the obtained pouch structure has good flexibility and remains safe from leakage of the electrolyte due to burst of the pouch. Further, by draw forming at least one of the films or sheets in a similar figure to the plate assembly, it is possible to achieve a further reduction of size of the battery. Such draw forming can be accomplished by known techniques such as vacuum forming, vacuum air-pressure forming, air-pressure forming, plug-assist forming, cold pressing, etc.

The film- or sheet-shaped synthetic resin used for the jacket is required to have an ability to prevent shortening of battery life due to moisture permeation or evaporation of the electrolyte while preventing the increase of self-discharge due to penetration of oxygen in the atmosphere and to maintain the interior of the battery in a reduced pressure condition by allowing release of hydrogen gas produced in a small quantity by self-discharge or other causes when the battery is left non-used. Such synthetic resin is also required to have enough burst and tensile strength to endure pressure variation in the battery, acid resistance to withstand dilute sulfuric acid in the electrolyte, and heat sealing property.

The pole post in the battery of the present invention is made of lead or a lead alloy in its body portion and is characterized in that a part of this body portion is coated with a layer of an epoxy synthetic resin having excellent adhesiveness to said lead or lead alloy and this layer is further coated with a polyolefin synthetic resin molding layer to enable heat seal with the jacket. More specifically, such post is produced in the following way.

To a part of a continuous sheet of lead or lead alloy, an epoxy synthetic resin having good adhesiveness thereto is applied as a band around said sheet and cured by heating or other means. On this band of epoxy synthetic resin is molded, as by injection molding, a polyolefin synthetic resin (made of polyethylene, an acid modified copolymer with an ethylene content of 50% by mole or more, polypropylene, or an acid modified propylene copolymer) having excellent heat sealing property. Then said sheet of lead or lead alloy is cut to a specified length to form the desired post. Two such posts are welded to the positive plate and the negative plates, respectively, of the plate assembly and heat sealed to the polyolefin film of the jacket which envelops the plate assembly, thereby sealing the end of each post extending out from the jacket to peripheral parts of the jacket.

Bisphenol A type epoxy resin is usually used as said epoxy resin, but other types of epoxy resin can also be used. It is also possible to employ thermosetting epoxy resin containing an epoxy curing agent having active hydrogen such as amines, phenols, polyamides, acid anhydrides and the like.

Epoxy resin which is liquid at normal temperature or has solvent solubility and can be dry baked is easy to treat.

The thickness of the epoxy resin coating is 0.1–10 $\mu$m, preferably 1–20 $\mu$m. Coating of epoxy resin can be accomplished by suitable means such as brush coating, dipping, roll coating, bar coating, spray coating, etc., to coat the whole surface or a part of the surface of the sheet-shaped lead or lead alloy post. Partial coating is preferred in view of welding to the plates. The surface of such epoxy resin coating may be roughened to a mat-like state for increasing adhesion to the polyolefin resin. Further, an inorganic filler such as glass powder or $SiO_2$ powder may be added to improve acid resistance.

Polyethylene (hereinafter referred to as PE) and polypropylene (hereinafter referred to as PP) have been mentioned as base resin of polyolefin type acid modified synthetic resins. They include low-density PE, medium-density PE, high-density PE, linear low-density PE, PP, and their polymers such as ethylene-propylene copolymer, ethylene-acrylic ester copolymer, ethylene-methacrylic ester copolymer, etc., all of which can be used in this invention either singly or in admixture.

As the modifying material for these acid modified resin, there can be used unsaturated carboxylic acids or their anhydrides such as acrylic acid, methacrylic acid, maleic acid, maleic anhydride, citraconic acid, citraconic anhydride, itaconic acid, itaconic anhydride and the like. The content of such modifying material in the acid modified resin is preferably 0.01–5% by weight.

Various methods such as injection molding, electrostatic coating, fluidization dip coating, etc., may be employed for molding of polyolefin synthetic resin. Insert injection molding is the method which can provide high dimensional precision of the molded product and is also high in efficiency.

EXAMPLE

The present invention will be described in more detail hereinbelow in accordance with an embodiment thereof, but it is to be understood that the present invention is not limited in its scope to such embodiment alone.

Figure 1:
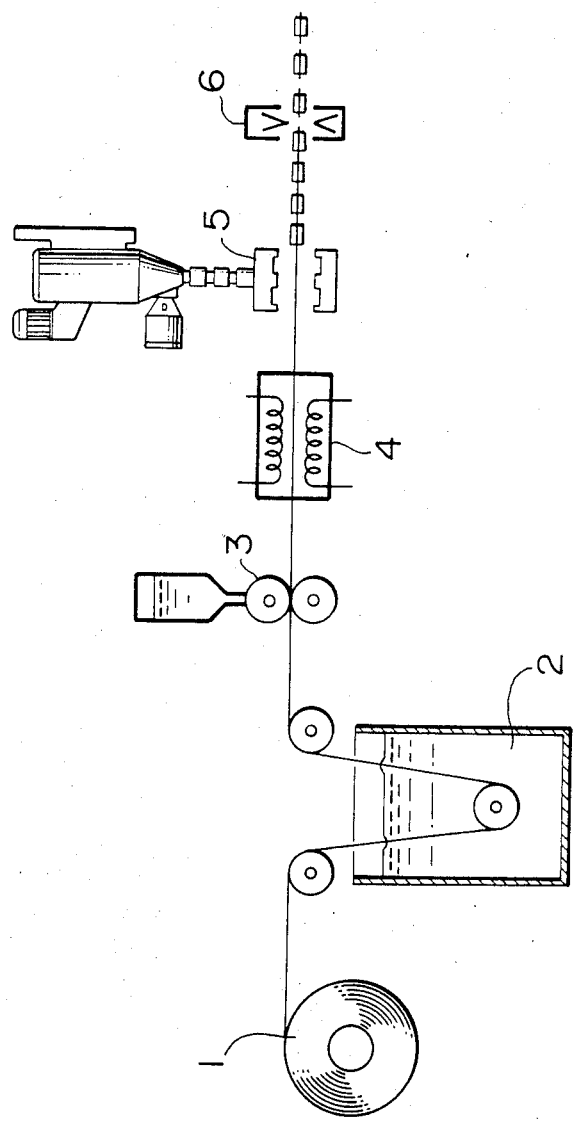
FIG. 1 is a flow chart illustrating schematically a process for producing pole posts used in the enclosed lead storage battery according to the present invention.
Figure 2:
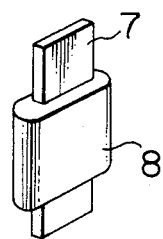
FIG. 2 is a perspective view of a completed post.

As illustrated in FIG. 1, a coiled sheet of lead or a lead alloy such as lead-tin alloy 1 is continuously supplied to the production process line and is first passed through a degreasing step 2 in which said sheet 1 is subjected to washing with an organic solvent such as alcohol or trichloroethylene, acid washing parker treatment, etc. After drying, the sheet proceeds into an epoxy resin coating step 3 where the sheet is coated with an epoxy resin like a band therearound to a predetermined thickness. The thus coated sheet is then heated and cured at 100°-200° C. in the curing step 4. A polyolefin resin may be molded after gelation of epoxy resin, and after molding of said polyolefin resin, the gelled epoxy resin may be heated and cured. Hot air heating, infrared heating, high frequency heating or other suitable method may be employed for heat curing of epoxy resin. After curing of epoxy resin coated on the lead sheet, a polyolefin resin having excellent adhesiveness to epoxy resin, for example acid-modified polyethylene 8 is injection molded on said epoxy resin coating by an injection molder 5. The molded product is then cut to a specified length by a cutter 6 to obtain the desired pole posts such as illustrated in FIG. 2.

Figure 3:
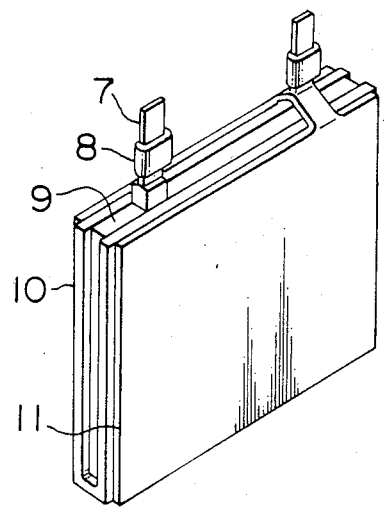
FIG. 3 is a perspective view of a plate assembly to which the posts have been welded.
Figure 4:
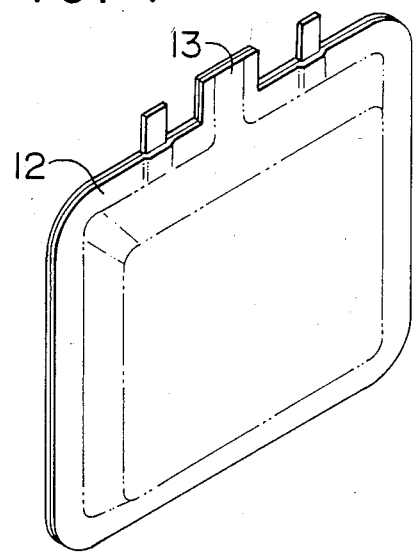
FIG. 4 is a perspective view of a completed enclosed lead storage battery having the plate assembly covered up by a jacket.

The thus produced posts 7 each having a polyethylene molding layer 8 are welded, as by arc welding, to the positive plate 9 and the negative plates 11, respectively, of a plate assembly consisting of a positive plate 9 enveloped by a U-shaped or inverted U-shaped separator 10 principally composed of glass fiber and a pair of negative plates 11 disposed on both sides thereof as shown in FIG. 3. The thus constructed plate assembly is sheathed with a jacket 12 made of various kinds of synthetic resin such as shown in Table 1, and peripheral parts of the jacket 12 are heat sealed each other excepting the portion which is to become a safety valve 13, which portion is left in a film-film adhering state, thereby completing an enclosed lead storage battery of the structure such as illustrated in FIG. 4.

Any of the produced enclosed lead storage batteries was of 2 V, 8 Ah specifications (with dimensional sizes of 150 mm in width, 75 mm in height and 15 mm in thickness, and a weight of 450 g). Each of these batteries was left in an atmosphere with an ambient temperature of 60° C. and a relative humidity of 20% for 4 weeks, and then the remaining electric capacity (%) after self discharge due to oxygen penetration through the jacket and battery weight loss (g) due to moisture penetration were measured, the results being shown in Table 1.

TABLE 1

| Jacket specification | Items of measurement | | | | Left at 60° C., 20% RH for 4 weeks | |
|---|---|---|---|---|---|---|
| | Tensile strength ($Kg/cm^2$) | Mullen burst strength ($Kg/cm^2/mm$) | Oxygen permeability ($cc/m^2 \cdot 24\ hr \cdot atm$) | Moisture permeability ($g/m^2 \cdot 24\ hr$) | Remaining electric capacity (%) | Weight loss (g) |
| (1) ABS resin thickness: 3 mm | 300–630 | — | 20 | 10 | 48 | 11.5 |
| (2) MDPE 200μ | 150–350 | 15–25 | 1100 | 5 | 23 | 8.3 |
| (3) PET 12μ/LDPE 90μ | 150–400 | 25–35 | 105 | 10 | 35 | 12.5 |
| (4) PET 12μ/PVDC 40μ/MDPE 80μ | 300–650 | 45–50 | 20 | 5 | 38 | 7.9 |
| (5) PET 15μ/OPP 30μ/CPP 80μ | 550–1150 | 90–160 | 8 | 2 | 61 | 5.6 |
| (6) OPP 23μ/PET 15μ/EAA 80μ | 500–1000 | 60–70 | 4 | 3 | 63 | 5.8 |
| (7) OPP 23μ/PET 15μ/MDPE 80μ | 450–1000 | 60–70 | 4 | 2 | 72 | 5.0 |
| (8) OPP 23μ/ON 20μ/MDPE 80μ | 700–1250 | 60–75 | 7 | 3 | 60 | 6.5 |
| (9) PET 23μ/PET fiber net/LLDPE 80μ | 1500–2000 | 250–300 | 8 | 3 | 58 | 6.2 |
| (10) OPP 20μ/PVA 20μ/EVA 100μ | 300–500 | 60–70 | 2 | 5 | 70 | 8.5 |
| (11) PET 12μ/saponified EVA 15μ/LDPE 150μ | 300–600 | 45–60 | 2 | 6 | 68 | 8.4 |
| (12) OPP 20μ/PVDC 3μ/PVA 15μ/PVDC 3μ/MDPE 120μ | 300–500 | 40–60 | 2 | 2 | 74 | 4.8 |
| (13) PBT 30μ/Barex 30μ/LLDPE 80μ | 500–1000 | 90–120 | 4 | 10 | 65 | 10.5 |
| (14) PET 12μ/CPP 33μ/EMMA 120μ | 300–500 | 40–60 | 8 | 5 | 63 | 8.2 |
| (15) PET 15μ/OPE 30μ/ionomer 120μ | 150–400 | 100–200 | 8 | 1 | 65 | 4.6 |
| (16) OPP 20μ/ON 18μ/MDPE 40μ//MDPE 40μ | 500–1000 | 90–150 | 8 | 3 | 63 | 6.0 |
| (17) PET 12μ/PVDC 3μ/EAA 80μ | 300–580 | 45–60 | 8 | 3 | 62 | 6.5 |

Regarding the jacket in Table 1, (1) is a conventional ABS resin cell mentioned before, (2) is a single film of medium-density polyethylene (MDPE) having a thickness of 200μ, and (3) is a laminate of a 90μ thick low-density polyethylene (LDPE) with excellent heat sealing property and acid resistance applied on the inside contacting the plate assembly and a 12μ thick polyethylene terephthalate (PET) film with excellent tensile strength and burst strength applied on the outside of the LDPE film. These are the comparative examples. (4) to (17) in Table 1 are the examples of the present invention. (4) is a laminate film made by laminating 80μ thick MDPE, 40μ thick polyvinylidene chloride (PVDC) and 12μ thick PET in this order from the inside for increasing strength and reducing oxygen and moisture permeability of the laminate film of (3). (5) is a film made by laminating 30μ thick biaxially oriented polypropylene (OPP) and 15μ thick PVDC-coated PET on 80μ thick heat-sealable cast polypropylene (CPP) for further increasing strength and further reducing oxygen and moisture permeability of the laminate film of (4). (6) is a film formed by laminating 15μ thick PET and 23μ thick PVDC-coated OPP on 80μ thick ethylene-acrylic acid copolymer (EAA) with high strength and excellent heat sealing property at low temperature. (7) is a laminate film obtained by coating PVDC on both layers of PET and OPP on the outside of MDPE for further increasing oxygen and moisture permeability than (5) and (6). (8) is a film made by laminating 20μ thick biaxially oriented nylon (ON) intermediate between OPP and MDPE films for increasing film strength. (9) is a film made by overlaying a net of 30μ size PET fibers on 80μ thick linear low-density polyethylene (LLDPE) having higher strength than LDPE for increasing tensile and burst strength while improving bending and tear strength, and further laminating thereon 15μ thick PVDC-coated PET. (10) is a film formed by laminating 20μ thick polyvinyl alcohol (PVA) and 20μ thick OPP on 100μ thick ethylene-vinyl acetate copolymer for reducing oxygen permeability. (11) is a film made by laminating 15μ thick saponified EVA and 12μ thick PET on 150μ thick LDPE for reducing oxygen permeability. (12) is a film produced by laminating 15μ thick PVA coated with 3μ thick PVDC on both sides thereof, 3μ thick PVDC and 20μ thick OPP on 120μ thick MDPE. (13) is a film made by laminating 80μ thick LLDPE and 30μ thick polybutylene terephthalate (PBT) by interposing therebetween 30μ thick Barex, an acrylonitrile-methacrylic acid copolymer produced by Victron Corp., U.S.A., for bettering toughness and moldability. (14) is a film formed by laminating 30μ thick PVDC-coated CPP and 12μ thick PET on 120μ thick ethylene-methyl methacrylate copolymer (EMMA) for increasing toughness, low temperature sealing properties and flexibility. (15) is a film made by laminating 30μ thick biaxially oriented polyethylene (OPE) and 15μ thick PVDC-coated PET on 120μ thick ionomer. (16) is a film of a double-wall pouch structure made by laminating 15μ thick PVDC-coated ON and 20μ thick OPP on 40μ thick MDPE and incorporating a 40μ thick MDPE pouch on the inside of the laminate film. (17) is a laminate film obtained by laminating 12μ thick biaxially oriented polyester PET coated with 3μ thick PVDC on 80μ thick EAA on the PVDC coated side so that the film has high strength, low oxygen and moisture permeability and excellent heat sealing property at low temperature.

Tensile strength of the respective jackets in Table 1 was determined according to JIS Z-1702, burst strength according to JIS P-8112, moisture permeability according to JIS Z-0208, and oxygen permeability according to ASTM D-1434-58.

As can be seen from Table 1, the laminate films made by laminating PET, PP or nylon in two or three layers on PE film showed 2-5 times increase of tensile strength and 3-8 times increase of burst strength in comparison with the conventional film of PE alone indicated by (2). Especially, the laminate film made by incorporating a net of PET fibers showed 5-10 times improvement of tensile strength and 10-15 times improvement of burst strength. Also, by coating PET or PP with PVDC, oxygen permeability was reduced to 1/100 to 1/200 of that of the conventional film made of PE alone while moisture permeability was reduced to about ½ of that of the conventional PE film, giving the better results than ABS resin used for the existing enclosed lead storage batteries.

It is also seen that the remaining electric capacity and weight loss of the enclosed lead storage batteries made by using said respective films, as measured after left under ambient temperature of 60° C. and relative humidity of 20% for 4 weeks, were substantially proportional to oxygen and moisture permeability of the respective films, and as seen from Table 1, the jackets of this invention showed 30-50% better retention of electric capacity and about ⅔ less battery weight loss than the conventional film made of PE alone. Even in comparison with ABS resin cell, the batteries according to the present invention were 10-20% better in retention of electric capacity and about ½ less in weight loss.

The pole posts in the batteries made by using the jackets shown in Table 1 were all made by forming a band-shaped acid-modified polyethylene resin coating on an epoxy resin layer. Similar posts were made by changing the type of coating resin, and after feeding a predetermined amount of electrolyte and subjecting the batteries to 20-hour initial charging at 1.5 A, the batteries were left under ambient temperature of 60° C. for 4 weeks and then the extent (length) of electrolyte penetration into each post was observed, the results being shown in Table 2.

TABLE 2

| Post | Post coating resin | Length of electrolyte penetration after initial charging (mm) | | Length of electrolyte penetration after left at 60° C. for 4 weeks (mm) | |
|---|---|---|---|---|---|
| | | Positive post | Negative post | Positive post | Negative post |
| No. 1 | Polyethylene | 5.0 | 6.5 | >10 (Leakage occured) | >10 (Leakage occured) |
| No. 2 | Polypropylene | 6.0 | 7.5 | >10 (Leakage occured) | >10 (Leakage occured) |
| No. 3 | Acid-modified polyethylene | 4.5 | 5.0 | >10 (Leakage occured) | >10 (Leakage occured) |
| No. 4 | Ethylene-acrylic acid copolymer | 4.0 | 6.0 | >10 (Leakage occured) | >10 (Leakage occured) |
| No. 5 | Epoxy resin + acid-modified polyethylene | 0 | 0.5 | 1.5 | 2.5 |
| No. 6 | Silane coupling agent + epoxy resin + acid-modified polyethylene | 0 | 0 | 0.5 | 1.0 |
| No. 7 | Epoxy resin + acid-modified ethylene-acrylic ester copolymer | 0 | 0 | 0.5 | 1.0 |

Post No. 1 was made by first degreasing the base material with ethyl alcohol and then coating it with polyethylene by injection molding. No. 2 is a post coated with polypropylene in the same way as Comparative Example 1. No. 3 is a post obtained by coating the base material with acid-modified polyethylene having better heat sealing property to metal than polyethylene in the same way as Nos. 1 and 2. No. 4 is a post coated with ethyleneacrylic acid copolymer having better heat sealing property to metal and higher strength than acid-modified polyethylene in the same way as Nos. 1–3. No. 5 is a post produced by coating the degreased base material with epoxy resin having excellent adhesiveness to metal and acid resistance, heating and curing the resin coating at 150° C. for 10 minutes and then further coating it with acid-modified polyethylene resin having good heat fusibility to epoxy resin by injection molding. No. 6 is a post obtained by coating the degreased base material with a generally known silane coupling agent having the effect of further enhancing adhesiveness of metal and epoxy resin, applying thereon epoxy resin, curing the same, and molding thereon acidmodified polyethylene by injection molding. No. 7 is a post made by molding on the epoxy coating ethylene-acrylic ester copolymer having better heat sealing property to metal and higher strength than acid-modified polyethylene used for the post of No. 5. Coating with epoxy resin may be preceded by pre-treatment coating with a dilute solution of polyester, acrylic, crosslinked nylon or other type of resin.

As seen from Table 2, even if the post is coated with polyethylene or its acid-modified resin or copolymer or polypropylene, the electrolyte begins to penetrate into the post, either positive or negative, during the initial charging, and leakage occurs when such post is left standing at 60° C. It is thus difficult in this case to seal the post portion. However, if epoxy resin coating is applied beneath the heat-sealable resin layer, there takes place little penetration of the electrolyte even when the battery is left standing at 60° C. for 4 weeks, and thus leakage of electrolyte can be well prevented. The leakage preventive effect is further improved when metal-epoxy resin adhesion is increased by using a silane or titanium coupling agent. The coupling agent may be applied by coating the epoxy resin layer with a dilute solution of coupling agent by suitable means such as dipping, brush coating, spray coating, etc., and then drying the coating, or by impregnating the epoxy resin layer with the coupling agent.

As described above, lamination of PET film, PP film, nylon film or a net of PE or PET fibers in two or more layers on the outside of polyolefin (such as polyethylene) film with excellent heat sealing property can greatly improve tensile strength and burst strength in comprison with the conventional film of PE alone, resulting in an increased reliability of enclosed lead storage battery.

Also, by laminating PVDC-coated film of PP or PET, or film of PVA, saponified EVA, polyacrylonitrile or its copolymer on polyolefin film, oxygen and moisture permeability can be appreciably reduced to minimize selfdischarge caused by penetration of oxygen. It also becomes possible to prevent reduction of battery capacity and life resulting from decrease of the electrolyte due to permeation and evaporation of water.

Further, provision of epoxy resin layer and polyolefin resin layer in lamination at the sealed portion of the post makes it possible to inhibit leakage of the electrolyte along the post to realize high-reliability post sealing by heat sealing.

What is claimed is:

1. An enclosed lead storage battery comprising a plate assembly consisting of a positive plate, negative plates and a separator, pole posts connected to said positive plate and said negative plates, respectively, an electrolyte held in position by said plate assembly, and a jacket made of film- or sheet-formed synthetic resin wherein:
    (a) each pole post is provided with a layer of polyolefin resin around at least a portion of each post, said layers of polyolefin being adhered to said posts by a layer of epoxy resin;
    (b) the jacket comprises a laminate film or sheet comprising a polyolefin film on the inside contacting the plate assembly and a film comprising at least two layers of thermoplastic synthetic resin on the outside thereof;
    (c) the jacket is heat sealed at its periphery surrounding the plate assembly, excepting a portion which serves as a safety valve and which is left in a film-to-film adhering state; and
    (d) the jacket is also heat sealed to the layers of polyolefin resin adhered to the pole posts.

2. An enclosed lead storage battery according to claim 1, wherein the polyolefin resin layer formed on the pole posts is made of a material selected from the group consisting of polyethylene, ethylene copolymer or its acid-modified resin, polypropylene, propylene copolymer or its acid-modified resin.

3. An enclosed lead storage battery according to claim 1, wherein the laminate of a polyolefin film on the inside of the jacket and a film of thermoplastic synthetic resin on the outside thereof is formed by dry lamination.

4. An enclosed lead storage battery according to claim 1, wherein the film laminated on the outside of the polyolefin film of the jacket is made of a material selected from the group consisting of polyethylene terephthalate (polyester), polypropylene, nylon (polyamide), polyvinyl alcohol, saponified ethylene-vinyl acetate copolymer, polyvinyl chloride, polybutylene terephthalate and copolymers thereof.

5. An enclosed lead storage battery according to claim 1, wherein a film coated with polyvinylidene chloride or laminated with polyvinylidene chloride film is incorporated to constitute at least one layer of the laminate film or sheet forming the jacket.

6. An enclosed lead storage battery according to claim 1, wherein a net of synthetic resin fibers is incorporated to constitute at least one layer of the laminate film or sheet forming the jacket.

7. An enclosed lead storage battery according to claim 1, wherein the jacket is made by disposing a film of polyethylene-ethylene copolymer or its acid-modified resin on the inside and dry laminating on the outside thereof a polyethylene terephthalate film coated with polyvinylidene chloride.

8. An enclosed lead storage battery according to claim 1, wherein the epoxy resin layer provided on the post is roughened at its surface like a mat.

9. An enclosed lead storage battery according to claim 1, wherein the jacket is less than 177 microns in thickness.

10. An enclosed lead storage battery according to claim 1, wherein the jacket is 95–177 microns in thickness.

* * * * *